(12) United States Patent
Silorio et al.

(10) Patent No.: US 12,537,370 B2
(45) Date of Patent: Jan. 27, 2026

(54) MULTI SOCKET POWER EXTENSION SOURCE

(71) Applicant: TOWA INDUSTRIES, INCORPORATED, Campbell, CA (US)

(72) Inventors: Ron Silorio, Pittsburg, CA (US); Richard K. Ogawa, Sr., Palo Alto, CA (US); James George Hanlon, Morgan Hill, CA (US)

(73) Assignee: Towa Industries, Incorporated, Campbell, CA (US)

( * ) Notice: Subject to any disclaimer, the term of this patent is extended or adjusted under 35 U.S.C. 154(b) by 695 days.

(21) Appl. No.: 17/876,949

(22) Filed: Jul. 29, 2022

(65) Prior Publication Data

US 2024/0039270 A1 Feb. 1, 2024

(51) Int. Cl.
| | |
|---|---|
| H02H 3/00 | (2006.01) |
| H02H 1/00 | (2006.01) |
| H02H 3/06 | (2006.01) |
| H02H 3/08 | (2006.01) |
| H02H 5/00 | (2006.01) |

(52) U.S. Cl.
CPC ............ *H02H 3/08* (2013.01); *H02H 1/0007* (2013.01); *H02H 3/06* (2013.01)

(58) Field of Classification Search
CPC ........... H02H 3/08; H02H 1/0007; H02H 3/06
USPC ......................................................... 361/71
See application file for complete search history.

(56) References Cited

U.S. PATENT DOCUMENTS

| | | | |
|---|---|---|---|
| 7,550,870 B2 | 6/2009 | Reynolds et al. | |
| 7,630,186 B2 | 12/2009 | Reynolds et al. | |
| 7,672,104 B2 | 3/2010 | Reynolds et al. | |
| 8,384,554 B1* | 2/2013 | Curtis | G01R 19/165 340/638 |
| 2004/0064198 A1 | 4/2004 | Reynolds et al. | |
| 2008/0309164 A1* | 12/2008 | Lim | H01R 13/7038 307/115 |
| 2009/0234512 A1* | 9/2009 | Ewing | G05B 15/02 700/295 |
| 2011/0270458 A1* | 11/2011 | Liu | H01R 13/713 700/293 |

(Continued)

*Primary Examiner* — Thienvu V Tran
*Assistant Examiner* — Lucy M Thomas
(74) *Attorney, Agent, or Firm* — Microelectronic Devices IP LLC; Shawn T. Walsh

(57) ABSTRACT

A multi-socket power extension source includes a power inlet port, and power outlets coupled to the power inlet port through switches. The multi-socket power extension source includes a controller configured to control the switches. The controller is configured to repetitively determine if an estimate of a total current through the power inlet port exceeds a prescribed current limit. When the estimated total current exceeds the prescribed current limit, the controller is configured to identify the outlet having the largest current increase and turn off the switch coupled to that outlet. The controller is further configured to reconnect the surge outlet, when an updated estimated total current is less than the prescribed current limit by at least the current of the surge outlet, or after a prescribed reconnect time period. The multi-socket power extension source may be coupled to a secondary multi-socket power extension source in an expansion configuration.

25 Claims, 7 Drawing Sheets

(56) References Cited

U.S. PATENT DOCUMENTS

| | | | |
|---|---|---|---|
| 2013/0026825 A1* | 1/2013 | Savage | H02M 1/4208 |
| | | | 307/9.1 |
| 2017/0279273 A1* | 9/2017 | Tischer | H02J 3/00 |
| 2018/0366885 A1* | 12/2018 | Hewitt | H01R 27/02 |
| 2022/0385089 A1* | 12/2022 | Silorio | H02J 7/0047 |

* cited by examiner

MULTI SOCKET POWER EXTENSION SOURCE

FIELD

This disclosure relates to the field of power extension sources. More particularly, but not exclusively, this disclosure relates to power extension sources with overcurrent protection.

BACKGROUND

Multi-socket power extension sources, sometimes referred to as power strips, provide multiple outlets for appliances, tools, and equipment, powered by a single power source, such as a wall outlet, generator, or battery pack. The power source is commonly regulated by a circuit breaker or other overcurrent component, which disconnects the power source when a current limit is exceeded. The appliances, tools, and equipment plugged into the multi-socket power extension source may draw current that fluctuates with use. The current may occasionally exceed the current limit of the overcurrent component, causing the power source to be disconnected. Disconnection may interrupt usage of the appliances, tools, and equipment, and may require resetting the overcurrent component.

SUMMARY

A multi-socket power extension source, referred to as a Smart Power Strip, includes a power inlet port and a plurality of power outlets coupled to the power inlet port through switches. Each power outlet is coupled to the power inlet port through a corresponding one of the switches. The Smart Power Strip also includes a controller coupled to the switches.

The Smart Power Strip may be implemented in a stand-alone mode. In the standalone mode, the controller is configured to repetitively determine if an estimated total current through the power inlet port exceeds a prescribed current limit. When the estimated total current exceeds the prescribed current limit, the controller is configured to identify the power outlet having the largest increase in estimated current, referred to as the surge outlet, and to cause the switch coupled to the surge outlet to be turned off, while leaving the remaining switches unchanged. The controller is configured to cause the switch that was turned off to be turned back on, at a later time.

The Smart Power Strip may be implemented in an expansion configuration. In one version of the expansion configuration, the Smart Power Strip may be implemented as a primary Smart Power Strip wherein the controller is a primary controller, with a secondary Smart Power Strip connected to the primary Smart Power Strip. The secondary Smart Power Strip has a secondary plurality of secondary power outlets coupled to a secondary power inlet port through secondary switches. A secondary controller of the secondary Smart Power Strip communicates with the primary controller of the primary Smart Power Strip. In this version of the expansion configuration, the primary controller is configured to repetitively determine if an estimated total current through the primary Smart Power Strip and the secondary Smart Power Strip exceeds the prescribed current limit. When the estimated total current exceeds the prescribed current limit, the primary controller is configured to identify the surge outlet of the primary Smart Power Strip and the secondary Smart Power Strip. The primary controller is further configured to cause the switch coupled to the surge outlet to be turned off, while leaving the remaining switches unchanged, and subsequently cause the switch coupled to the surge outlet to be turned back on at a later time.

In another version of the expansion configuration, the Smart Power Strip may be implemented as a secondary Smart Power Strip, wherein the controller is a secondary controller and the outlets are secondary outlets, with a primary Smart Power Strip connected to the secondary Smart Power Strip. A primary controller of the primary Smart Power Strip communicates with the secondary controller of the secondary Smart Power Strip. In this version of the expansion configuration, the secondary controller is configured to provide estimates of currents through the outlets of the secondary Smart Power Strip to the primary controller. When one of the secondary outlets is identified as the surge outlet, the secondary controller is configured to cause the switch coupled to the surge outlet to be turned off, while leaving the remaining switches unchanged. The secondary controller is configured to cause the switch coupled to the surge outlet to be turned back on at a later time.

In a further version of the expansion configuration, the Smart Power Strip may be implemented as a secondary Smart Power Strip, wherein the controller is a secondary controller, with a primary Smart Power Strip connected to the secondary Smart Power Strip and a tertiary Smart Power Strip connected to the secondary Smart Power Strip. The tertiary Smart Power Strip has a tertiary of tertiary power outlets coupled to a tertiary power inlet port through tertiary switches. A primary controller of the primary Smart Power Strip communicates with the secondary controller of the secondary Smart Power Strip, and a tertiary controller of the tertiary Smart Power Strip communicates with the secondary controller. In this version of the expansion configuration, the secondary controller is configured to provide estimates of currents through the outlets of the secondary Smart Power Strip to the primary controller, and to pass estimates of currents through the tertiary outlets from the tertiary controller to the primary controller.

DETAILED DESCRIPTION

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For the purposes of this disclosure, it will be understood that, if a component is disclosed as being "connected" or "coupled" to another component, it may be directly connected or directly coupled to the other element, or intervening components may be present. In either case, components that are coupled or connected together are capable of direct current (DC) electrical conductivity between the coupled/connected components, unless otherwise noted.

Figure 1:
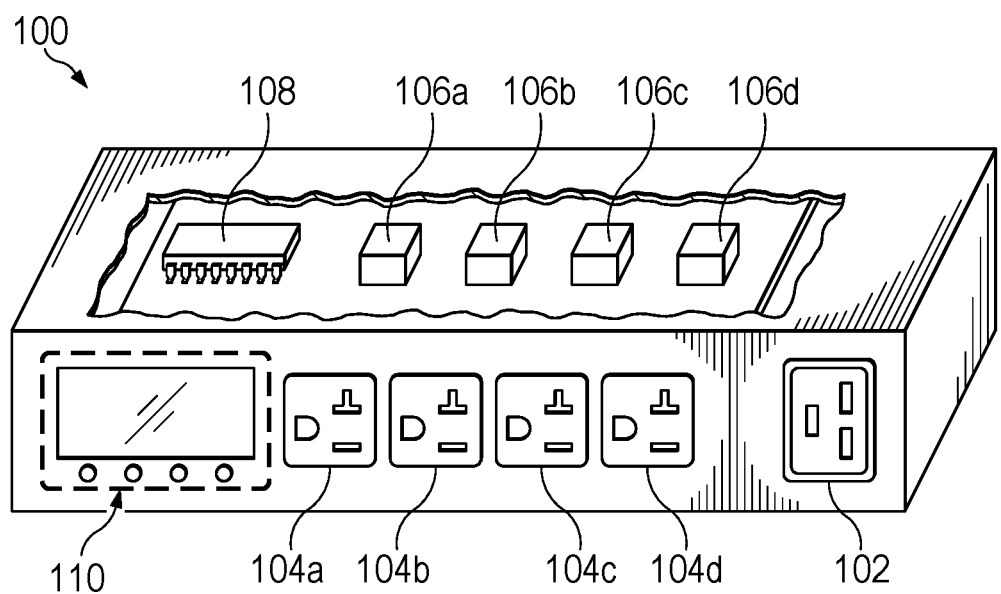
FIG. 1 is a view of an example Smart Power Strip.

FIG. 1 is a view of an example Smart Power Strip. The Smart Power Strip 100 includes a power inlet port 102. The power inlet port 102 may be manifested as a C20 connector or a C14 connector, by way of example. The Smart Power Strip 100 includes a plurality of power outlets 104a, 104b, 104c, and 104d. In an alternate version of this example, the plurality of power outlets may have two or three power outlets, or may have five or more power outlets. The power outlets 104a through 104d may be implemented as outlets, by way of example. Each power outlet 104a through 104d is coupled to the power inlet port 102 through a switch 106a, 106b, 106c, and 106d, respectively, of the Smart Power Strip 100. The switches 106a through 106d may be implemented as electromechanical relays or solid state relays, by way of example. The switches 106a through 106d are coupled to a controller 108, which is configured to turn the switches 106a through 106d on and off. The controller 108 may be implemented as a microcontroller, a microcomputer, or an industrial controller, by way of example. The Smart Power Strip 100 of this example may include a user interface 110. The user interface 110 may include a display panel, which may show a total current through the Smart Power Strip 100. The user interface 110 may also include indicator lights, which may indicate a status, for example, on or off, of each of the switches 106a through 106d. The user interface 110 may further include user input components, not specifically shown, such as buttons or switches. The Smart Power Strip 100 is a self-contained unit, that is, the power inlet port 102, the power outlets 104a through 104d, the switches 106a through 106d, the controller 108, and the user interface 110 are integrated into a package such as a metal enclosure. The Smart Power Strip 100 may have length, width and height dimensions that are each less than 50 centimeters, and may weigh less than 10 kilograms, by way of example, which may advantageously allow installation of the Smart Power Strip 100 in a desired location by a person, without need for assistance.

The Smart Power Strip 100 may be operated in a standalone mode, that is, the Smart Power Strip 100 may be operated without being coupled to a computer, a network, or another controlling device. During operation of the Smart Power Strip 100 in the standalone mode, the power inlet port 102 is coupled to a power source, not shown, such as a wall outlet, a generator, a battery pack, or a fuel cell. The power source may be protected from excess current by an overcurrent component, such as a circuit breaker or fuse. The controller 108 is configured to repetitively determine if an estimated total current through the power inlet port 102 exceeds a prescribed current limit that is less than a maximum allowable current of the overcurrent component. The prescribed current limit may be selected to reduce a possibility of an accidental overload. For example, the prescribed current limit may be selected as 60 percent to 80 percent of the maximum allowable current. A time period between successive determinations by the controller 108 is less than a shutoff time of the overcurrent component. By way of example, common circuit breakers may have a shutoff time, also known as a "trip time," of several seconds when the total current exceeds 125 percent of the maximum allowable current. The shutoff time may decrease to less than a second when the total current exceeds 200 percent of the maximum allowable current. The controller 108 may be configured to repetitively determine if the estimated total current through the power inlet port 102 exceeds the prescribed current limit by being configured to repetitively generate estimates of outlet currents through the power outlets 104a through 104d, one estimate for each power outlet 104a through 104d, and add the estimates of the outlet currents to generate estimated total current. An estimate of current used by the controller 108 and associated components and circuits of the Smart Power Strip 100 may optionally be added in the estimated total current.

The controller 108 is also configured to identify the power outlet 104a through 104d having the largest increase in estimated current, hereinafter the surge outlet 104a through 104d, when the estimated total current exceeds the prescribed current limit. The increase in estimated current may be taken as the largest increase since the most recent previous estimated outlet current. That is, the increase in estimated current may be calculated by subtracting the previous estimated outlet current from the present estimated outlet current. The surge outlet 104a through 104d may be identified by comparing a change in estimated current for each power outlet 104a through 104d, with the power outlet 104a through 104d having the largest increase in estimated current being identified as the surge outlet 104a through 104d.

The controller 108 is further configured to turn off the switch 106a through 106d coupled to the surge outlet 104a through 104d, in less time than the shutoff time for the overcurrent component. The controller 108 is configured to leave remaining switches 106a through 106d unchanged, to advantageously maintain power to the appliances, tools, equipment, or such, plugged into the remaining power outlets 104a through 104d.

The controller 108 is configured to turn back on the switch 106a through 106d that was turned off, at a later time. In one version of this example, the controller 108 may be configured to turn the switch 106a through 106d back on when an updated estimated total current with the surge outlet 104a through 104d disconnected is less than the prescribed current limit by at least the estimated current through the surge outlet 104a through 104d, that is, when the Smart Power Strip 100 can accommodate the expected current through the surge outlet 104a through 104d, within the prescribed current limit. In another version of this example, the controller 108 may be configured to turn the switch 106a through 106d back on after a prescribed reconnect time period. The prescribed reconnect time period may be 60 seconds to 5 minutes, by way of example.

Figure 2:
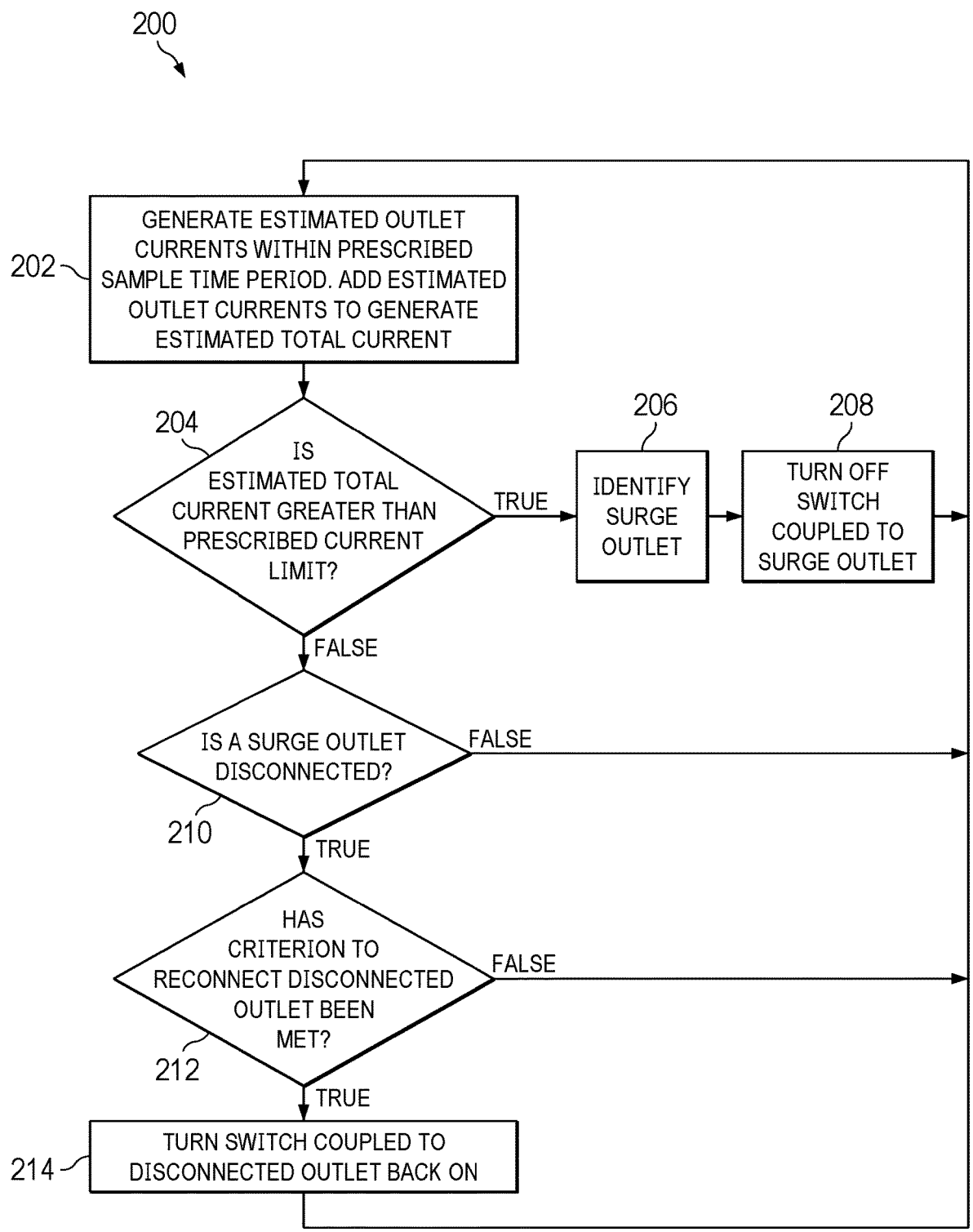
FIG. 2 is a flowchart of an example method of operating the Smart Power Strip of FIG. 1 in the standalone mode.

FIG. 2 is a flowchart of an example method of operating the Smart Power Strip 100 of FIG. 1 in the standalone mode. Components of the Smart Power Strip 100 referenced in the disclosure of the method 200 are described in reference to FIG. 1. The controller 108 is configured to execute the steps of the method 200.

The method 200 includes step 202 which includes the controller 108 generating estimates of the currents through the power outlets 104a through 104d, referred to in FIG. 2 as estimated outlet currents. Subsequently, the controller 108 adds the estimated outlet currents to generate an estimated total current within a prescribed sample time period from generating a previous estimated total current. The prescribed sample time period is less than the shutoff time for the overcurrent component. The controller 108 may generate the estimated total current at a prescribed sampling frequency, in which time periods between successive determinations are less than the shutoff time for the overcurrent component. That is, a period of the prescribed sampling frequency is less than the shutoff time. Alternatively, controller 108 may generate the estimated total current by restarting a timer after each determination and making the next determination within the prescribed sample time period.

After execution of step 202, the method 200 continues with step 204, which is a decision step to determine if the estimated total current is greater than the prescribed current limit. If the result of step 204 is TRUE, that is, the estimated total current is greater than the prescribed current limit, execution of the method 200 branches to step 206. If the result of step 204 is FALSE, that is, the estimated total current is not greater than the prescribed current limit, execution of the method 200 branches to step 210.

Step 206, which is executed when the determination of step 204 is TRUE, includes identifying the surge outlet 104a through 104d. In one version of step 206, the controller 108 may recall stored values of the latest estimated outlet currents and stored values of previous estimated outlet currents, and subtract the previous estimated outlet currents from the latest estimated outlet currents, to generate delta current estimates for each power outlet 104a through 104d. The controller 108 compares the delta current estimates to each other to identify the surge outlet 104a through 104d. In another version of step 206, the controller 108 may generate new estimated outlet currents, and subtract the previous estimated outlet currents from the new estimated outlet currents to generate the delta current estimates. After the surge outlet 104a through 104d is identified, execution of the method 200 branches to step 208. The identity and the estimated current through the surge outlet 104a through 104d may be stored by the controller 108 for use in steps 210 and 212.

In step 208, the controller 108 turns off the switch 106a through 106d coupled to the surge outlet 104a through 104d. The controller 108 may turn off the switch 106a through 106d by providing an appropriate potential or current to the corresponding switch 106a through 106d. A potential applied to the corresponding switch 106a through 106d may be 1 to 12 volts, for example, or may be a ground potential at approximately zero volts. A current applied to the corresponding switch 106a through 106d may be a few microamperes to a few milliamperes, or may be less than a microampere. After execution of step 208, the method 200 branches back to step 202.

Step 210, which is executed when the determination of step 204 is FALSE, is a decision step to determine if one of the power outlets 104a through 104d was identified as a surge outlet and disconnected during execution of step 208, and remains disconnected. The controller 108 may recall a stored identity of the surge outlet. The controller 108 may subsequently determine if the surge outlet remains disconnected by checking a status, on or off, of the corresponding switch 106a through 106d. If the determination of step 210 is TRUE, that is, the surge outlet remains disconnected, execution of the method 200 branches to step 212. If the determination of step 210 is FALSE, that is, surge outlet is not disconnected, execution of the method 200 branches back to step 202.

Step 212, which is executed when the determination of step 210 is TRUE, is a decision step to determine if a reconnection criterion to reconnect the disconnected surge outlet 104a through 104d has been met. In one version of step 212, in which the estimated outlet current through the disconnected surge outlet 104a through 104d was stored, the reconnection criterion may be that the estimated total current with the surge outlet 104a through 104d reconnected is less than the prescribed current limit. In another version of step 212, the reconnection criterion may be that the prescribed reconnect time period has elapsed since the surge outlet 104a through 104d was disconnected. If the determination of step 212 is TRUE, that is, the criterion to reconnect the disconnected surge outlet 104a through 104d has been met, execution of the method 200 branches to step 214. If the determination of step 212 is FALSE, that is, the criterion to reconnect the disconnected surge outlet 104a through 104d has not been met, execution of the method 200 branches back to step 202.

Step 214, which is executed when the determination of step 212 is TRUE, includes reconnecting the disconnected surge outlet 104a through 104d. The controller 108 reconnects the disconnected surge outlet 104a through 104d by turning the corresponding switch 106a through 106d back on. The controller 108 may turn on the switch 106a through 106d by providing an appropriate potential or current to the corresponding switch 106a through 106d. After execution of step 214, execution of the method 200 branches back to step 202.

Figure 3A:
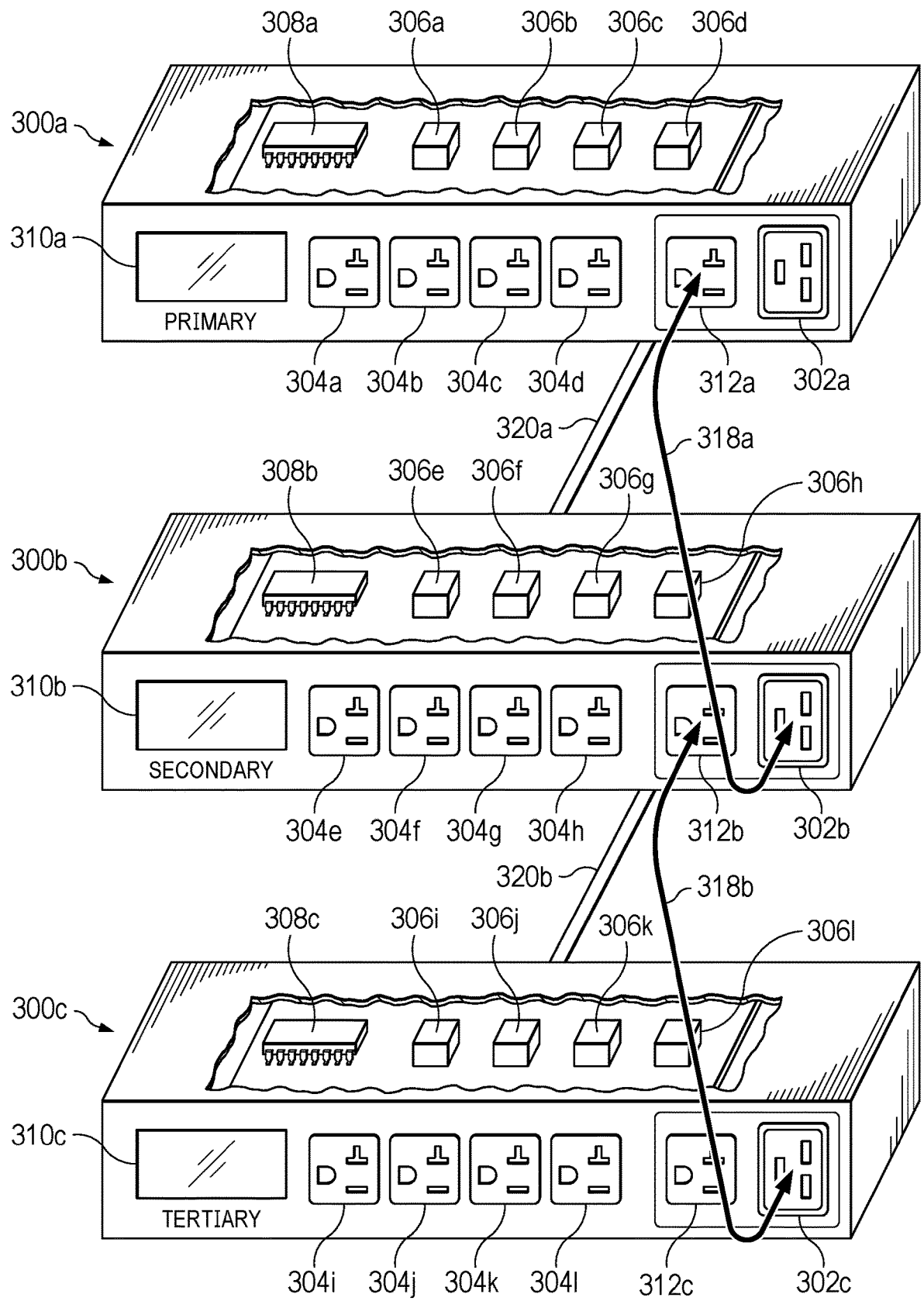
FIG. 3A and FIG. 3B are views of a primary Smart Power Strip, a secondary Smart Power Strip, and a tertiary Smart Power Strip coupled together in an expansion configuration.
Figure 3B:
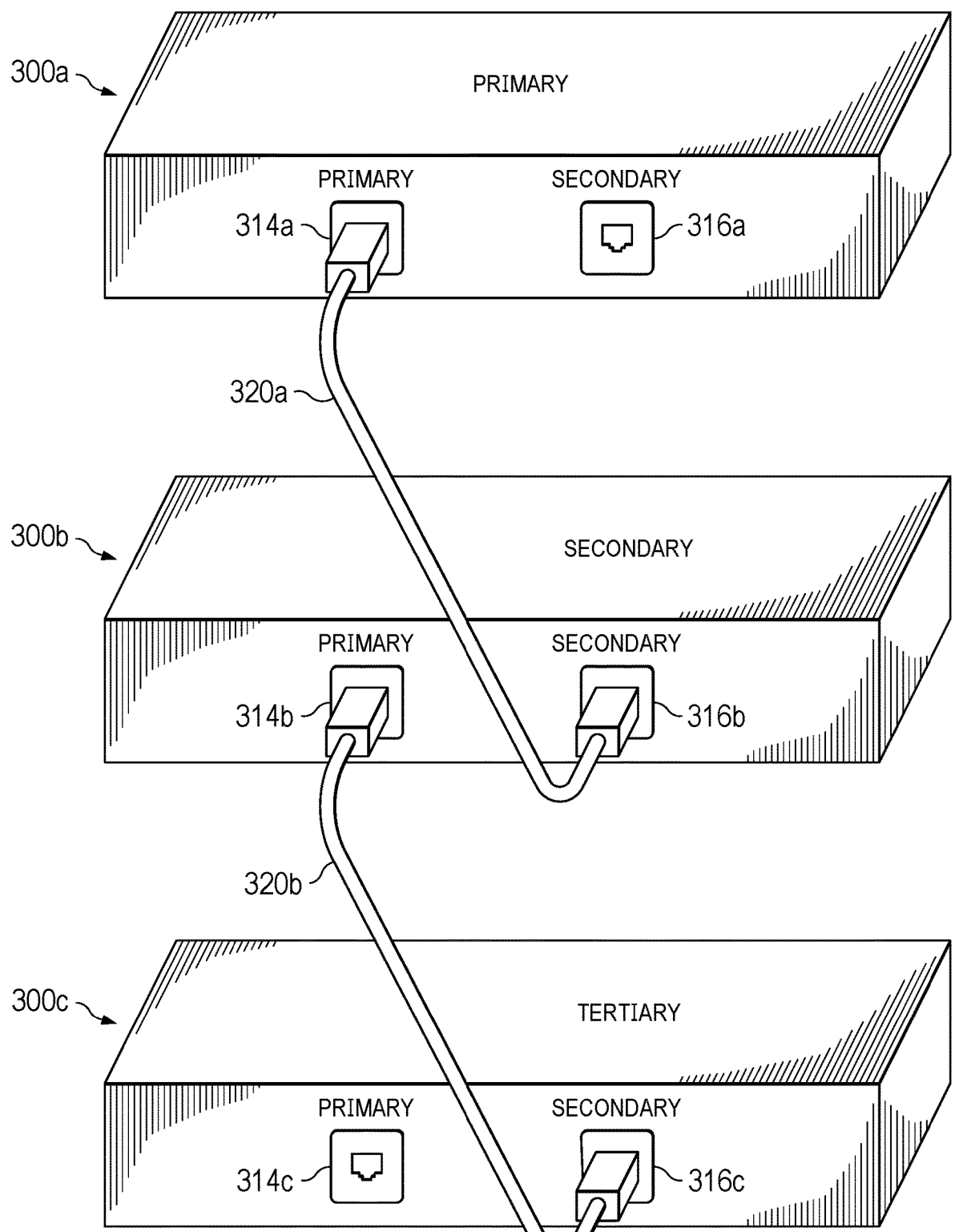

FIG. 3A and FIG. 3B are views of a primary Smart Power Strip, a secondary Smart Power Strip, and a tertiary Smart Power Strip coupled together in an expansion configuration. The primary Smart Power Strip 300a, labeled "PRIMARY" in FIG. 3A and FIG. 3B, includes a primary power inlet port 302a and a plurality of primary power outlets 304a, 304b, 304c, and 304d. The primary power inlet port 302a is coupled to a primary expansion outlet 312a in parallel with the primary power outlets 304a through 304d. The primary expansion outlet 312a may be implemented as a same outlet type as the primary power outlets 304a through 304d, such as a 5-20R outlet. Each primary power outlet 304a through 304d is coupled to the primary power inlet port 302a through a primary switch 306a, 306b, 306c, and 306d, respectively, of the primary Smart Power Strip 300a. The primary switches 306a through 306d are coupled to a primary controller 308a. The primary controller 308a is configured to turn the primary switches 306a through 306d on and off. The primary Smart Power Strip 300a may include a primary user interface 310a. The primary Smart Power Strip 300a of this example includes a primary bus port 314a, labeled "PRIMARY" in FIG. 3B, and a secondary bus port 316a, labeled "SECONDARY" in FIG. 3B. The primary bus port 314a and the secondary bus port 316a are coupled to the primary controller 308a by one or more buses, not shown, enabling the primary controller 308a to communicate with other components, external to the primary Smart Power Strip 300a, that are coupled to the primary bus port 314a or the secondary bus port 316a.

The secondary Smart Power Strip 300b, labeled "SECONDARY" in FIG. 3A and FIG. 3B, includes a secondary power inlet port 302b and a plurality of secondary power outlets 304e, 304f, 304g, and 304h. Each secondary power outlet 304e through 304h is coupled to the secondary power inlet port 302b through a secondary switch 306e, 306f, 306g, and 306h, respectively, of the secondary Smart Power Strip 300b. The secondary switches 306e through 306h are coupled to a secondary controller 308b, which is configured to turn the secondary switches 306e through 306h on and off. The secondary Smart Power Strip 300b may include a secondary user interface 310b. The secondary Smart Power Strip 300b may optionally include a secondary expansion outlet 312b. The secondary Smart Power Strip 300b of this example includes a primary bus port 314b, labeled "PRIMARY" in FIG. 3B, and a secondary bus port 316b, labeled "SECONDARY" in FIG. 3B. The primary bus port 314b and the secondary bus port 316b are coupled to the secondary controller 308b by one or more buses, not shown. The secondary Smart Power Strip 300b may be substantially identical to the primary Smart Power Strip 300a.

The tertiary Smart Power Strip 300c, labeled "TERTIARY" in FIG. 3A and FIG. 3B, includes a tertiary power inlet port 302c and a plurality of tertiary power outlets 304i, 304j, 304k, and 304l. Each tertiary power outlet 304i through 304l is coupled to the tertiary power inlet port 302c through a tertiary switch 306i, 306j, 306k, and 306l, respectively, of the tertiary Smart Power Strip 300c. The tertiary switches 306i through 306l are coupled to a tertiary controller 308c, which is configured to turn the tertiary switches 306i through 306l on and off. The tertiary Smart Power Strip 300c may include a tertiary user interface 310c. The tertiary Smart Power Strip 300c may optionally include a tertiary expansion outlet 312c. The tertiary Smart Power Strip 300c of this example includes a primary bus port 314c, labeled "PRIMARY" in FIG. 3B, and a secondary bus port 316c, labeled "SECONDARY" in FIG. 3B. The primary bus port 314c and the secondary bus port 316c are coupled to the tertiary controller 308c by one or more buses, not shown. The tertiary Smart Power Strip 300c may be substantially identical to the primary Smart Power Strip 300a.

The secondary bus port 316b of the secondary Smart Power Strip 300b is coupled to the primary bus port 314a of the primary Smart Power Strip 300a by a first data cable 320a. The secondary bus port 316c of the tertiary Smart Power Strip 300c is coupled to the primary bus port 314b of the secondary Smart Power Strip 300b by a second data cable 320b. Connecting the primary Smart Power Strip 300a, the secondary Smart Power Strip 300b, and the tertiary Smart Power Strip 300c as disclosed with the data cables 320a and 320b provides the expansion configuration.

The primary Smart Power Strip 300a, the secondary Smart Power Strip 300b, and the tertiary Smart Power Strip 300c may each be housed in separate enclosures, as depicted in FIG. 3A and FIG. 3B. Alternatively, the primary Smart Power Strip 300a, the secondary Smart Power Strip 300b, and the tertiary Smart Power Strip 300c may be housed together in a single enclosure, with the data cables 320a and 320b located in the single enclosure.

During operation of the primary Smart Power Strip 300a in the expansion configuration, the secondary Smart Power Strip 300b, and the tertiary Smart Power Strip 300c in the expansion configuration, the primary power inlet port 302a is coupled to a power source, not shown, having an overcurrent component, not shown. The secondary power inlet port 302b of the secondary Smart Power Strip 300b may be coupled to the primary expansion outlet 312a of the primary Smart Power Strip 300a by a first power cable 318a, as indicated schematically in FIG. 3B. The primary expansion outlet 312a, being coupled to the primary power inlet port 302a, provides power from the power source to the secondary Smart Power Strip 300b through the first power cable 318a. Alternatively, the secondary power inlet port 302b of the secondary Smart Power Strip 300b may be coupled directly to the power source. The tertiary power inlet port 302c of the tertiary Smart Power Strip 300c may be coupled to the secondary expansion outlet 312b of the secondary Smart Power Strip 300b by a second power cable 318b, as indicated schematically in FIG. 3B, so that the tertiary Smart Power Strip 300c, or may be coupled directly to the power source.

The primary controller 308a is configured to repetitively determine if an estimated total current through the primary Smart Power Strip 300a and the secondary Smart Power Strip 300b exceeds a prescribed current limit. The primary controller 308a may accomplish this by generating estimates of the currents through the primary power outlets 304a through 304d, and transmitting a request to the secondary controller 308b to provide estimates of the currents through the secondary power outlets 304e, 304f, 304g, and 304h, individually or combined, and a request to the tertiary controller 308c to provide estimates of the currents through the tertiary power outlets 304i through 304l, individually or combined. The primary controller 308a is configured to add the estimated outlet currents to generate an estimated total current for all three Smart Power Strips 300a, 300b, and 300c. The individual estimated outlet currents may be stored by the primary controller 308a, or by the respective controllers 308a, 308b, and 308c, for subsequent use is determining the identity of a surge outlet.

When the estimated total current exceeds the prescribed current limit, the primary controller 308a is configured to identify the surge outlet 304a through 304h. In versions of this example in which the primary controller 308a has stored the estimated outlet currents, the primary controller 308a may identify the surge outlet 304a through 304h by recalling stored values of the latest estimated outlet currents and stored values of previous estimated outlet currents, and subtracting the previous estimated outlet currents from the latest estimated outlet currents, to generate delta current estimates for each power outlet 304a through 304l. In versions of this example in which the respective controllers 308a, 308b, and 308c have stored the estimated outlet currents, the primary controller 308a may recall the latest and previous estimated outlet currents for the primary power outlets 304a through 304d, and transmit requests to the secondary controller 308b and the tertiary controller 308c for the latest and previous estimated outlet currents for the remaining power outlets 304e through 304l. Alternatively, the primary controller 308a may generate new estimated outlet currents for the primary power outlets 304a through 304d, and transmit requests to the secondary controller 308b and the tertiary controller 308c for new estimated outlet currents for the remaining power outlets 304e through 304l. After the primary controller 308a has the most recent and previous estimated outlet currents for all the power outlets 304a through 304l, the primary controller 308a may subtract the previous estimated outlet currents from the most recent estimated outlet currents, to generate delta current estimates for each power outlet 304a through 304l. The primary controller 308a may then identify the surge outlet 104a through 104l by comparing the delta current estimates to each other.

The primary controller 308a is further configured to cause the switch 306a through 306h coupled to the surge outlet 304a through 304h to be turned off. If the surge outlet 304a through 304h is one of the primary power outlets 304a through 304d, the primary controller 308a is configured to turn off the primary switch 306a through 306d coupled to the surge outlet 304a through 304d. If the surge outlet 304a through 304h is one of the secondary power outlets 304e through 304h, the primary controller 308a is configured to transmit an instruction to the secondary controller 308b through the first data cable 320a, having an instruction to turn off the secondary switch 306e through 306h coupled to the surge outlet 304e through 304h. If the surge outlet 304a through 304h is one of the tertiary power outlets 304i through 304l, the primary controller 308a is configured to transmit an instruction to the tertiary controller 308c, via the secondary controller 308b, through the data cables 320a and 320b, having an instruction to turn off the tertiary switch 306i through 306l coupled to the surge outlet 304i through 304l. The tertiary controller 308c is configured to receive the instruction and turn off the tertiary switch 306i through 306l coupled to the surge outlet 304i through 304l.

The primary controller 308a is configured to cause the switch 306a through 306h that was turned off to be turned back on, at a later time. If the switch 306a through 306h that was turned off is one of the primary switches 306a through 306d, the primary controller 308a is configured to turn on the switch 306a through 306d that was turned off. If the switch 306a through 306h that was turned off is one of the secondary switches 306e through 306h, the primary controller 308a is configured to transmit an instruction to the secondary controller 308b through the first data cable 320a, having an instruction to turn on the secondary switch 306e through 306h that was turned off. If the switch 306a through 306h that was turned off is one of the tertiary switches 306i through 306l, the primary controller 308a is configured to transmit an instruction to the tertiary controller 308c via the secondary controller 308b through the data cables 320a and 320b, having an instruction to turn on the tertiary switch 306i through 306l that was turned off.

During operation of the secondary Smart Power Strip 300b in the expansion configuration, the secondary controller 308b may be configured to receive a request from the primary controller 308a to provide estimates of the currents through the secondary power outlets 304e through 304h. The secondary controller 308b is further configured to generate the estimates of the currents through the secondary power outlets 304e through 304h and transmit the estimated outlet currents to the primary controller 308a. Alternatively, the secondary controller 308b may be configured to transmit the estimated outlet currents to the primary controller 308a without the request from the primary controller 308a. The secondary controller 308b may be configured to store the estimated outlet currents. The secondary controller 308b may be further configured to pass estimated outlet currents for the tertiary power outlets 304i through 304l from the tertiary controller 308c to the primary controller 308a.

When the estimated total current exceeds the prescribed current limit, the secondary controller 308b may be configured to receive the request from the primary controller 308a to provide previous estimated outlet currents for the secondary power outlets 304e through 304h and transmit the previous estimated outlet currents to the primary controller 308a. When the estimated total current exceeds the prescribed current limit, the secondary controller 308b may be configured to receive the request from the primary controller 308a to provide new estimated outlet currents for the secondary power outlets 304e through 304h and transmit the new estimated outlet currents to the primary controller 308a. The secondary controller 308b may be further configured to pass previous estimated outlet currents and/or new estimated outlet currents for the tertiary power outlets 304i through 304l from the tertiary controller 308c to the primary controller 308a.

When the surge outlet 304a through 304h is one of the secondary power outlets 304e through 304h, the secondary controller 308b is configured to receive the instruction from the primary controller 308a to turn off the secondary switch 306e through 306h coupled to the surge outlet 304e through 304h and to execute the instruction. The secondary controller 308b is configured to receive the instruction to turn on the secondary switch 306e through 306h that was turned off at a later time and to execute the instruction. When the surge outlet 304a through 304h is one of the tertiary power outlets 304i through 304l, the secondary controller 308b may be further configured to pass the instruction from the primary controller 308a, to turn off the tertiary switch 306i through 306l coupled to the surge outlet 304i through 304l, to the tertiary controller 308c, and to pass the instruction from the primary controller 308a, at a later time, to turn on the tertiary switch 306i through 306l coupled to the surge outlet 304i through 304l, to the tertiary controller 308c.

During operation of the tertiary Smart Power Strip 300c in the expansion configuration, the tertiary controller 308c may be configured to receive a request from the primary controller 308a, optionally via the secondary controller 308b, to provide estimates of the currents through the tertiary power outlets 304i through 304l. The tertiary controller 308c is further configured to generate the estimates of the currents through the tertiary power outlets 304i through 304l and transmit the estimated outlet currents to the primary controller 308a, optionally via the secondary controller 308b. Alternatively, the tertiary controller 308c may be configured to transmit the estimated outlet currents to the primary controller 308a without the request from the primary controller 308a. The tertiary controller 308c may be configured to store the estimated outlet currents.

When the estimated total current exceeds the prescribed current limit, the tertiary controller 308c may be configured to receive the request from the primary controller 308a to provide previous estimated outlet currents for the tertiary controller 308c and transmit the previous estimated outlet currents to the primary controller 308a. When the estimated total current exceeds the prescribed current limit, the tertiary controller 308c may be configured to receive the request from the primary controller 308a to provide new estimated outlet currents for the tertiary power outlets 304i through 304l and transmit the new estimated outlet currents to the primary controller 308a.

When the surge outlet 304a through 304h is one of the tertiary power outlets 304i through 304l, the tertiary controller 308c is configured to receive the instruction from the primary controller 308a to turn off the tertiary switch 306i through 306l coupled to the surge outlet 304i through 304l and to execute the instruction. The tertiary controller 308c is configured to receive the instruction to turn on the tertiary switch 306i through 306l that was turned off at a later time and to execute the instruction.

Figure 4:
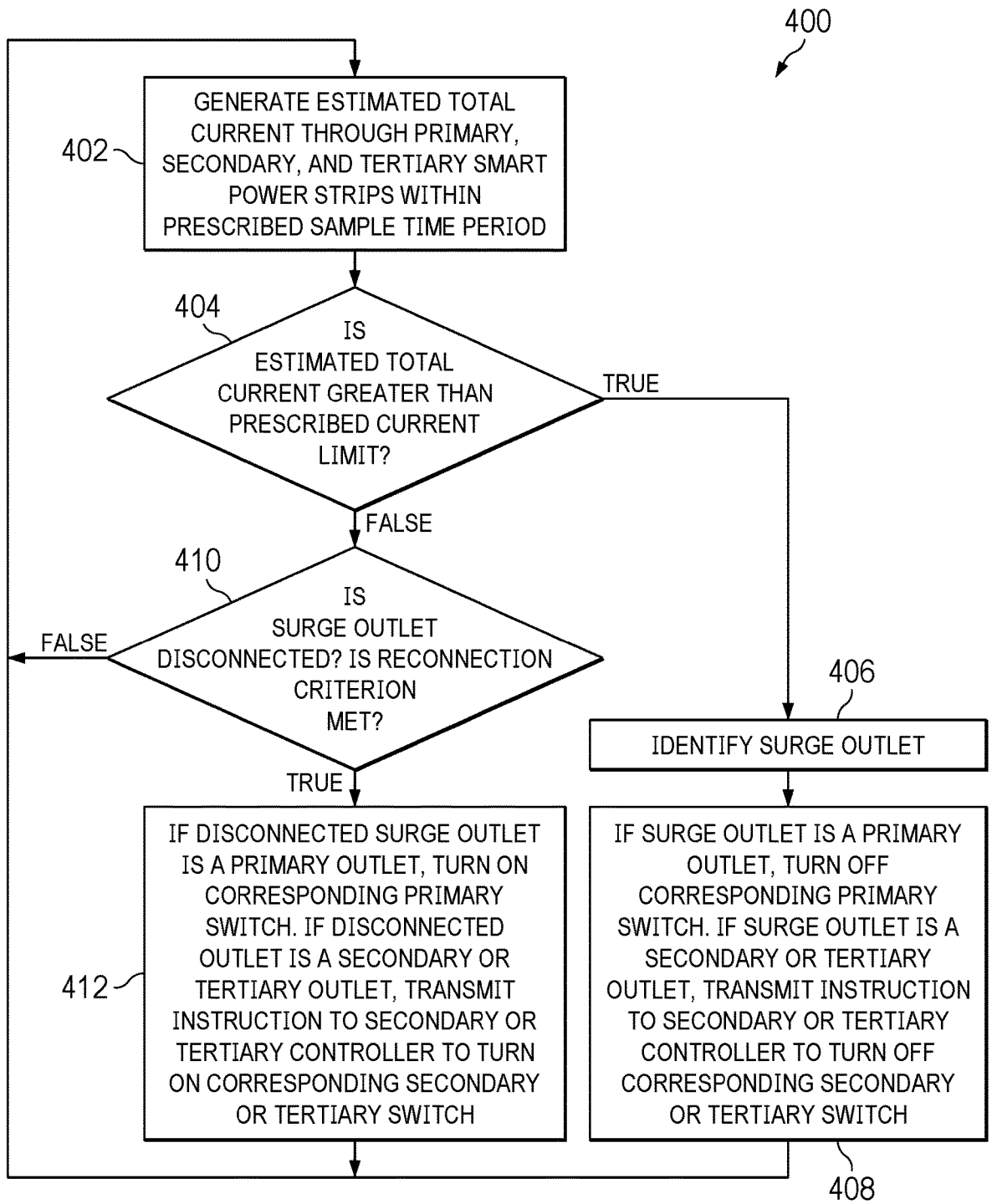
FIG. 4 is a flowchart of an example method of operating the primary Smart Power Strip with the secondary Smart Power Strip and the tertiary Smart Power Strip of FIG. 3A and FIG. 3B in the expansion configuration.

FIG. 4 is a flowchart of an example method of operating the primary Smart Power Strip 300a with the secondary Smart Power Strip 300b and the tertiary Smart Power Strip 300c of FIG. 3A and FIG. 3B in the expansion configuration. Components of the primary Smart Power Strip 300a, the secondary Smart Power Strip 300b, and the tertiary Smart Power Strip 300c referenced in the disclosure of the method 400 are described in reference to FIG. 3A and FIG. 3B. The primary controller 308a is configured to execute the steps of the method 400.

The method 400 includes step 402 in which the primary controller 308a generates the estimated total current through the primary Smart Power Strip 300a, the secondary Smart Power Strip 300b, and the tertiary Smart Power Strip 300c within the prescribed sample time period. In one version of step 402, the primary controller 308a may generate an outlet current estimate of each current through the primary power outlets 304*a* through 304*d*, transmit a request to the secondary controller 308*b* for individual outlet current estimates through the secondary power outlets 304*e* through 304*h*, and transmit a request to the tertiary controller 308*c* for individual outlet current estimates through the tertiary power outlets 304*i* through 304*l*. Upon receiving the individual outlet current estimates from the secondary controller 308*b* and the tertiary controller 308*c*, the primary controller 308*a* may add the outlet current estimates. In another version of step 402, the primary controller 308*a* may generate an estimate of the combined current through the primary power outlets 304*a* through 304*d*, transmit requests to the secondary controller 308*b* and the tertiary controller 308*c* for estimates of the combined currents through the secondary power outlets 304*e* through 304*h* and through the tertiary power outlets 304*i* through 304*l*, respectively. Upon receiving the combined outlet current estimates from the secondary controller 308*b* and the tertiary controller 308*c*, the primary controller 308*a* may add the combined outlet current estimates. The primary controller 308*a* may generate the estimated total current at a prescribed sampling frequency or by restarting a timer after each determination and making the next determination within the prescribed sample time period.

After execution of step 402, the method 400 continues with step 404, which is a decision step to determine if the estimated total current is greater than the prescribed current limit. If the result of step 404 is TRUE, that is, the estimated total current is greater than the prescribed current limit, execution of the method 400 branches to step 406. If the result of step 404 is FALSE, that is, the estimated total current is not greater than the prescribed current limit, execution of the method 400 branches to step 410.

Step 406, which is executed when the determination of step 404 is TRUE, includes identifying the surge outlet 304*a* through 304*h*. If the primary controller 308*a* has stored the values of the latest estimated outlet currents and the values of previous estimated outlet currents for all the power outlets 304*a* through 304*l*, the primary controller 308*a* may recall the stored values and subtract the previous estimated outlet currents from the latest estimated outlet currents, to generate delta current estimates for each power outlet 304*a* through 304*l*. If the latest estimated outlet currents and the values of previous estimated outlet currents for all the power outlets 304*a* through 304*l* have been stored by the respective primary, secondary, and tertiary controllers 308*a*, 308*b*, and 308*c*, the primary controller 308*a* may recall the latest and previous estimated outlet currents for the primary power outlets 304*a* through 304*d*, and obtain the latest and previous estimated outlet currents for the remaining power outlets 304*e* through 304*l* from the secondary controller 308*b* and the tertiary controller 308*c*, as disclosed in reference to FIG. 3A and FIG. 3B. Alternatively, new estimated outlet currents for the power outlets 304*a* through 304*l* may be acquired, as disclosed in reference to FIG. 3A and FIG. 3B. The primary controller 308*a* may subtract the previous estimated outlet currents from the most recent estimated outlet currents, to generate delta current estimates for each power outlet 304*a* through 304*l*, and compare the delta current estimates to each other to identify the surge outlet 104*a* through 104*l*. After completion of step 406, execution of the method 400 continues with step 408.

In step 408, the primary controller 308*a* causes the corresponding switch 306*a* through 306*h* coupled to the surge outlet 304*a* through 304*h* to be turned off. The primary controller 308*a* is configured to turn off the primary switch 306*a* through 306*d* coupled to the surge outlet 304*a* through 304*d*, if the surge outlet 304*a* through 304*h* is one of the primary power outlets 304*a* through 304*d*.

If the surge outlet 304*a* through 304*h* is one of the secondary power outlets 304*e* through 304*h*, the primary controller 308*a* is configured to transmit an instruction to the secondary controller 308*b* through the first data cable 320*a*, having an instruction to turn off the surge outlet 304*e* through 304*h*, The secondary controller 308*b* is configured to receive the instruction and turn off the secondary switch 306*e* through 306*h* coupled to the surge outlet 304*e* through 304*h*.

If the surge outlet 304*a* through 304*h* is one of the tertiary power outlets 304*i* through 304*l*, the primary controller 308*a* is configured to transmit an instruction to the tertiary controller 308*c*, via the secondary controller 308*b*, through the first data cable 320*a* and the second data cable 320*b*, having an instruction to turn off the surge outlet 304*i* through 304*l*, The tertiary controller 308*c* is configured to receive the instruction and turn off the tertiary switch 306*i* through 306*l* coupled to the surge outlet 304*i* through 304*l*. After execution of step 408, the method 400 branches back to step 402.

Step 410, which is executed when the determination of step 404 is FALSE, is a decision step which includes determining if one of the power outlets 304*a* through 304*l* was identified as a surge outlet and disconnected during execution of step 408, and remains disconnected. If a surge outlet 304*a* through 304*l* has been disconnected, step 410 also includes determining if a reconnection criterion to reconnect the disconnected surge outlet 304*a* through 304*l* has been met.

To determine if one of the power outlets 304*a* through 304*l* was identified as a surge outlet and disconnected, the primary controller 308*a* may recall a stored identity of the surge outlet. If the primary controller 308*a* identifies a surge outlet among the primary power outlets 304*a* through 304*d*, the primary controller 308*a* may subsequently determine if the surge outlet 304*a* through 304*d* remains disconnected by checking a status, on or off, of the corresponding primary switch 306*a* through 306*d*. If the primary controller 308*a* identifies a surge outlet among the second power outlets 304*e* through 304*h* or the tertiary power outlets 304*i* through 304*l*, the primary controller 308*a* may transmit a request to the secondary controller 308*b* or the tertiary controller 308*c*, respectively, to check a status of the corresponding secondary switch 306*e* through 306*h* or tertiary switch 306*i* through 306*l*, and report the status to the primary controller 308*a*. If the primary controller 308*a* determines that none of the power outlets 304*a* through 304*l* was identified as a surge outlet, the determination of step 410 is FALSE, and the primary controller 308*a* may skip the process of determining if the reconnection criterion has been.

To determine if the reconnection criterion has been met, in one version of step 410, the primary controller 308*a* may recall a most recent estimated outlet current through the surge outlet 304*a* through 304*l*, and add that most recent estimated outlet current to a present total estimated current; if the sum is less than the prescribed current limit, the reconnection criterion may be met, and the determination of step 410 is TRUE. If the sum is not less than the prescribed current limit, the reconnection criterion is not met, and the determination of step 410 is FALSE. In another version of step 410, if a prescribed reconnect time period has elapsed since the surge outlet 304*a* through 304*l* was disconnected, the reconnection criterion may be met, and the determination of step 410 is TRUE. If the prescribed reconnect time period has not elapsed, the reconnection criterion is not met, and the determination of step 410 is FALSE. If the determination of step 410 is TRUE, that is, one of the power outlets 304a through 304l was identified as a surge outlet and disconnected and the criterion to reconnect the disconnected surge outlet 304a through 304l has been met, execution of the method 400 branches to step 412. If the determination of step 410 is FALSE, that is, none of the power outlets 304a through 304l was identified as a surge outlet or the criterion to reconnect the disconnected surge outlet 304a through 304l has not been met, execution of the method 400 branches back to step 402.

Step 412, which is executed when the determination of step 410 is TRUE, includes the primary controller 308a causing the switch 306a through 306h coupled to the surge outlet 304a through 304l identified in step 410 to be turned back on. If the switch 306a through 306h coupled to the surge outlet 304a through 304l is one of the primary switches 306a through 306d, the primary controller 308a turns the switch 306a through 306d back on. If the switch 306a through 306h that was coupled to the surge outlet 304a through 304l is one of the secondary switches 306e through 306h, the primary controller 308a transmits an instruction to the secondary controller 308b through the first data cable 320a, having an instruction to turn on the secondary switch 306e through 306h. The secondary controller 308b receives the instruction and turns the secondary switch 306e through 306h back on. If the switch 306a through 306h that was turned off is one of the tertiary switches 306i through 306l, the primary controller 308a transmits an instruction to the tertiary controller 308c via the secondary controller 308b through the data cables 320a and 320b, having an instruction to turn on the tertiary switch 306i through 306l. The tertiary controller 308c receives the instruction and turns the tertiary switch 306i through 306l back on.

Figure 5:
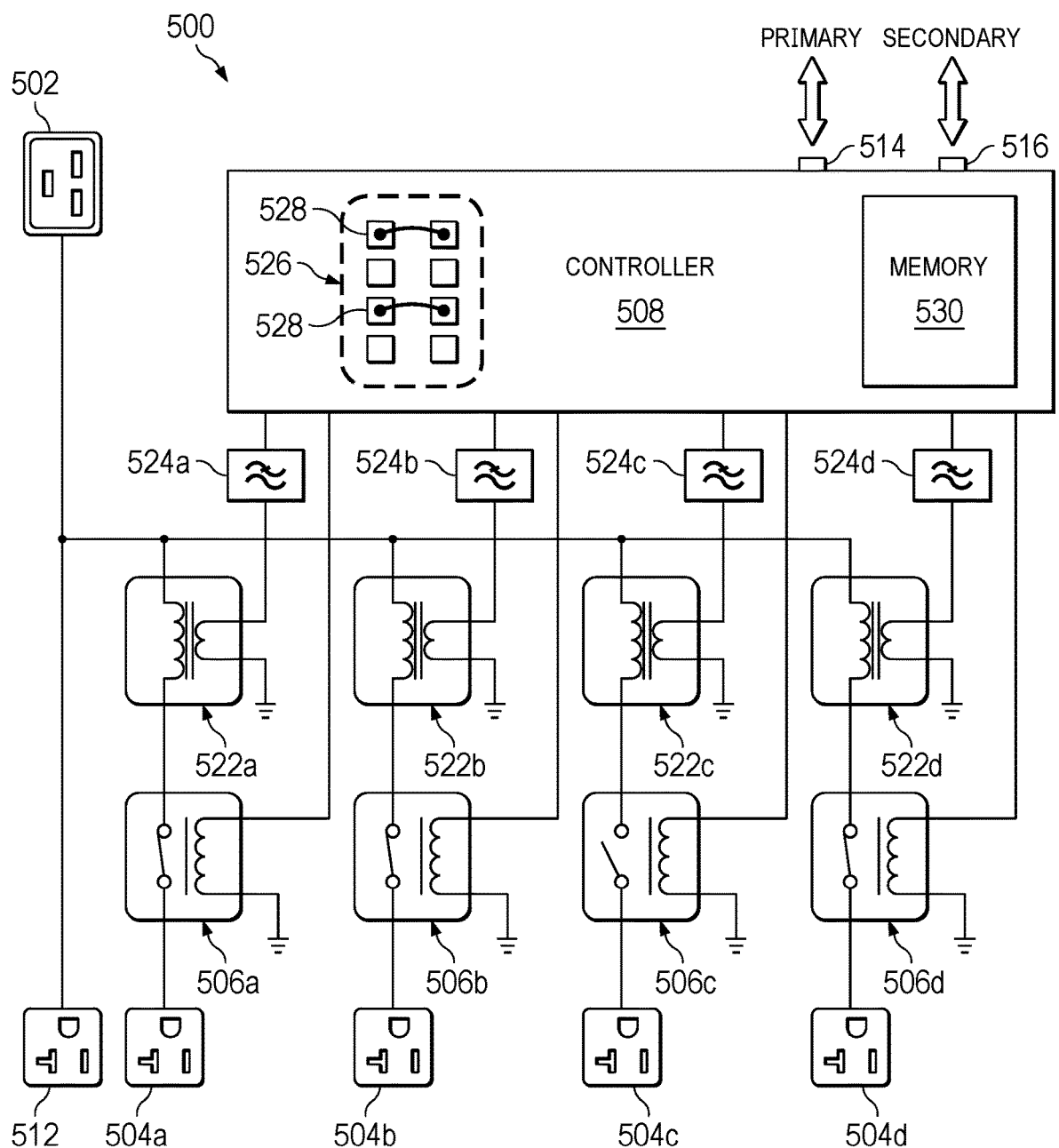
FIG. 5 is a schematic of an example Smart Power Strip.

FIG. 5 is a schematic of an example Smart Power Strip. The Smart Power Strip 500 includes a power inlet port 502. The Smart Power Strip 500 includes a plurality of power outlets 504a, 504b, 504c, and 504d; fewer or more power outlets are within the scope of this example. Each power outlet 504a through 504d is coupled to the power inlet port 502 through a switch 506a, 506b, 506c, and 506d, respectively, of the Smart Power Strip 500. The switches 506a through 506d are coupled to a controller 508, which is configured to turn the switches 506a through 506d on and off. Switches 506a, 506b, and 506d are depicted in an ON state in FIG. 5, in which an operable current may pass sufficient power through switches 506a, 506b, and 506d, to operate appliances, tools, equipment, or such, not shown, that are plugged in to power outlets 504a, 504b, and 504d. Switch 506c is depicted in an OFF state, in which no significant current may pass through switch 506c. The switches 506a through 506d may be manifested as any of the examples disclosed in reference to the switches 106a through 106d of FIG. 1. The controller 508 is coupled to the power inlet port 502, which provides current to operate the controller 508.

The Smart Power Strip 500 of this example includes current sensors 522a, 522b, 522c, and 522d, configured to measure current flowing to the power outlets 504a through 504d, respectively. The current sensors 522a through 522d may be manifested as magnetic inductive sensors, resistive sensors with differential voltage taps, Hall effect magnetic sensors, or giant magnetoresistance (GMR) sensors, by way of example. Each current sensor 522a through 522d is configured to provide signals corresponding to currents through the respective power outlet 504a through 504d. The controller 508 is coupled to the current sensors 522a through 522d, and is configured to acquire the signals and generate estimates of the currents to the respective power outlets 504a through 504d. The controller 508 may optionally be coupled to the current sensors 522a through 522d through low pass filters 524a, 524b, 524c, and 524d, respectively. The low pass filters 524a through 524d may reduce transients in the signals from the current sensors 522a through 522d to the controller 508, advantageously enabling a more accurate estimate of the currents to the respective power outlets 504a through 504d.

The Smart Power Strip 500 of this example includes a current limit input circuit 526 having jumpers 528 that may be preset to select a prescribed current limit from a range of current limit values. The prescribed current limit is selected to be less than a maximum allowable current of an overcurrent component, not shown, of a power source, not shown, that may provide power to the Smart Power Strip 500.

The Smart Power Strip 500 of this example may be operated in the standalone mode. In the standalone mode, the controller 508 is configured to repetitively determine if an estimated total current through the power inlet port 502 exceeds the prescribed current limit. The controller 508 of this example may estimate total current through the power inlet port 502 by acquiring the signals from the current sensors 522a through 522d, generating an estimated outlet current for each signal, and adding the estimated outlet currents. The controller 508 may record the values of the estimated outlet currents in a memory component 530 of the controller 508, for use in generating delta current estimates for each power outlet 504a through 504d. The controller 508 may add in an estimate of the current used by the controller 508 itself to the estimated total current.

The controller 508 is further configured to identify the surge outlet 504a through 504d, when the estimated total current exceeds the prescribed current limit. The controller 508 may recall recent previous estimated outlet currents from the memory component 530 for each power outlet 504a through 504d, and subtract the previous estimated outlet currents from the present estimated outlet currents to generate the delta current estimates. Alternatively, the controller 508 may acquire new signals from the current sensors 522a through 522d, for use in generating the delta current estimates.

The controller 508 is further configured to turn off the switch 506a through 506d coupled to the surge outlet 504a through 504d, respectively. The controller 508 is configured to reconnect the power outlet 504a through 504d that was disconnected, at a later time. The controller 508 may be configured to reconnect the surge outlet 504a through 504d as disclosed in reference to FIG. 1.

The Smart Power Strip 500 of this example may be operated as a primary Smart Power Strip 500 in the expansion configuration with a secondary Smart Power Strip, not shown in FIG. 5, and optionally a tertiary Smart Power Strip, not shown in FIG. 5. The secondary Smart Power Strip and the tertiary Smart Power Strip may be substantially identical to the primary Smart Power Strip 500. The primary Smart Power Strip 500 may include an expansion outlet 512 coupled to the power inlet port 502. The primary Smart Power Strip 500 may further include a primary bus port 514 and a secondary bus port 516, coupled to the controller 508. In the expansion configuration, the primary bus port 514 is coupled to the secondary Smart Power Strip, as disclosed in reference to FIG. 3B. The Smart Power Strip 500 of this example may be operated as a secondary Smart Power Strip 500 or a tertiary Smart Power Strip 500 in the expansion configuration.

Figure 6:
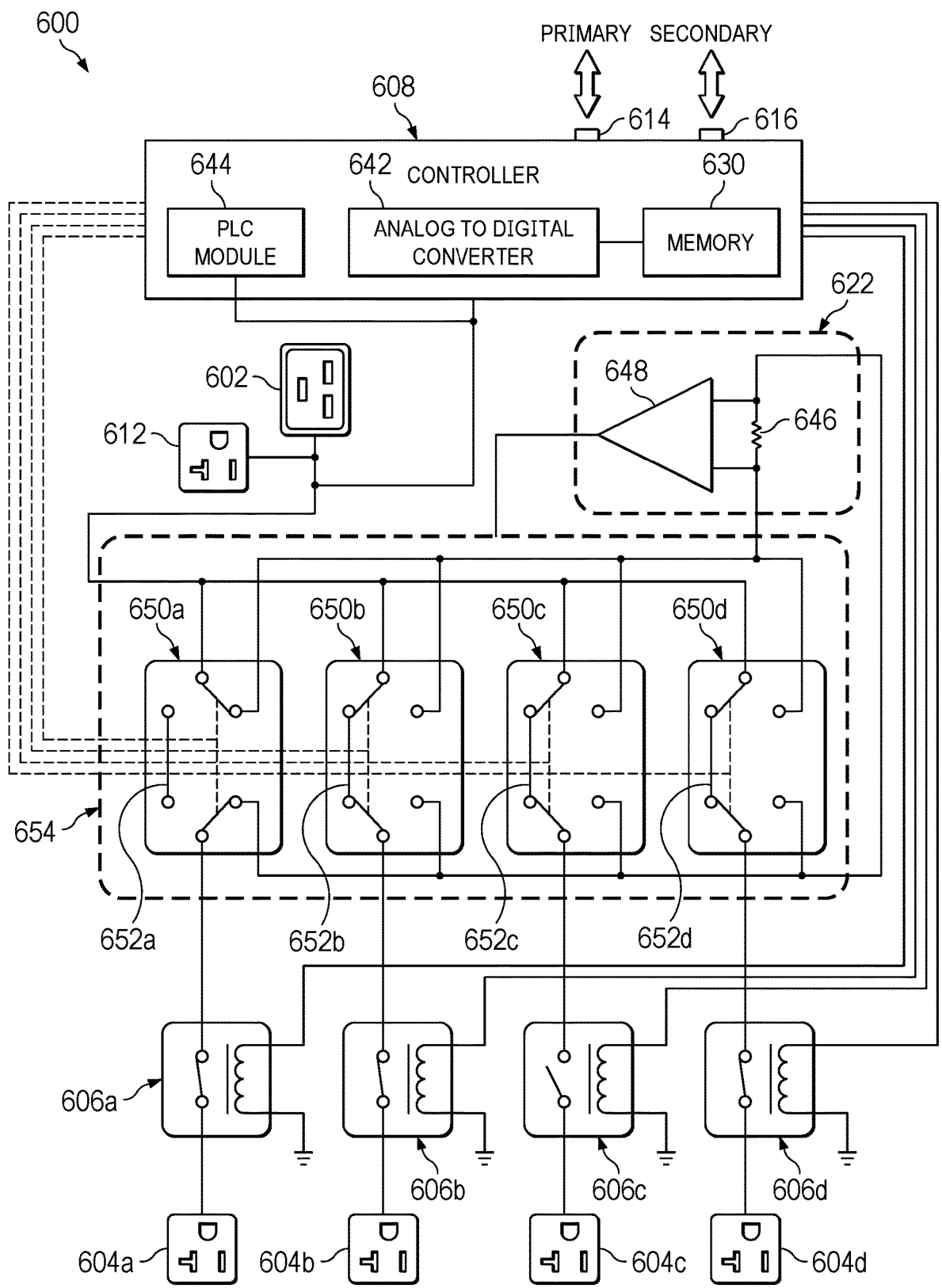
FIG. 6 is a schematic of another example Smart Power Strip.

FIG. 6 is a schematic of another example Smart Power Strip. The Smart Power Strip 600 includes a power inlet port 602. The power inlet port 602 may be manifested as any of the examples disclosed in reference to the power inlet port 102 of FIG. 1. The Smart Power Strip 600 includes a controller 608, having a memory component 630 and an analog to digital converter (ADC) 642 in this example. The controller 608 is coupled to the power inlet port 602, which provides current to operate the controller 608. A power source, not shown, provides power to the Smart Power Strip 600 through the power inlet port 602. The power source has a maximum allowable current, wherein the power source shuts off current to the Smart Power Strip 600 within a shutoff time, when current through the power source exceeds the maximum allowable current. The controller 608 of this example may include a power line communication (PLC) module 644 coupled to power inlet port 602. The PLC module 644 may receive information from the power source, such as the value of the maximum allowable current, enabling the controller 608 to set a prescribed current limit.

The Smart Power Strip 600 includes a plurality of power outlets 604a, 604b, 604c, and 604d; fewer or more power outlets are within the scope of this example. Each power outlet 604a through 604d is coupled to the power inlet port 602 through a switch 606a, 606b, 606c, and 606d, respectively, of the Smart Power Strip 600. The switches 606a through 606d are coupled to the controller 608, which is configured to turn the switches 606a through 606d on and off. Switches 606a, 606b, and 606d are depicted in an ON state in FIG. 6, in which an operable current may pass through switches 606a, 606b, and 606d. Switch 606c is depicted in an OFF state; no significant current may pass through switch 606c in the OFF state. The switches 606a through 606d may be manifested as any of the examples disclosed in reference to the switches 106a through 106d of FIG. 1.

The Smart Power Strip 600 of this example includes a current sensor 622 configured to measure a total current flowing through the power inlet port 602 and through the current sensor 622. The current sensor 622 is depicted in FIG. 6 as a resistor 646 coupled to a differential amplifier 648, but may be manifested as another type of current sensor. The current sensor 622 is coupled to the controller 608.

The Smart Power Strip 600 of this example further includes shunt switches 650a, 650b, 650c, and 650d, coupled in series to the switches 606a through 606d, respectively. The shunt switches 650a through 650d have two connected single pole double throw switches in parallel. In a shunt state, the shunt switches 650a through 650d are configured to couple the corresponding power outlets 604a through 604d to the power inlet port 602 through shunts 652a, 652b, 652c, and 652d, respectively, of the shunt switches 650a through 650d. In a measure state, the shunt switches 650a through 650d are configured to couple the corresponding power outlets 604a through 604d to the power inlet port 602 through the current sensor 622. The shunt switches 650a through 650d are controlled by the controller 608, which is configured to set the shunt switches 650a through 650d in the shunt state and in the measure state. The shunt switches 650a through 650d provide a multiplexer 654 of the Smart Power Strip 600. The shunt switches 650a through 650d may be set in the measure state one at a time, or all at once, or in subsets of the shunt switches 650a through 650d. The current sensor 622 provides a current signal to the controller 608 corresponding to the currents through the power outlets 604a through 604d coupled to the shunt switches 650a through 650d in the measure state. The shunt switches 650a through 650d may be switched from the shunt state to the measure state rapidly enough to hold disruption of power to appliances, tools or equipment connected to the power outlets 604a through 604d to an acceptable level. Similarly, the shunt switches 650a through 650d may be switched from the measure state to the shunt state rapidly enough to maintain an acceptably low disruption of power. Other architectures for the multiplexer 654 are within the scope of this example.

The Smart Power Strip 600 of this example may be operated in the standalone mode. In the standalone mode, the controller 608 is configured to repetitively determine if an estimated total current through the power inlet port 602 exceeds the prescribed current limit. The controller 608 may generate the estimated total current by setting the shunt switches 650a through 650d to the measure state, one at a time, which routes each outlet current through the current sensor 622, one at a time. The controller 608 is configured to acquire the current signals from the current sensor 622, digitize the current signals using the ADC 642, generate the estimated outlet currents using the digitized current signals, and add the values of the estimated outlet currents to generate the estimated total current. The controller 608 may apply a digital filter procedure, such as a low-pass filter procedure or a band-pass filter procedure, to the digitized current signals to reduce effects of unwanted transients and noise in the current signals from the current sensor 622. The controller 608 may store the values of the estimated outlet currents and the identities of the corresponding power outlets 604a through 604d in the memory component 630, for later use in generating delta current estimates for each power outlet 604a through 604d.

The controller 608 is further configured to identify the surge outlet 604a through 604d, when the estimated total current exceeds the prescribed current limit. The controller 608 may generate delta current estimates, as disclosed in reference to FIG. 2.

The controller 608 is further configured to turn off the switch 606a through 606d coupled to the surge outlet 604a through 604d, respectively, and to reconnect the power outlet 604a through 604d that was disconnected, at a later time. The controller 608 may be configured to disconnect and reconnect the surge outlet 604a through 604d as disclosed in reference to FIG. 1. The Smart Power Strip 600 of this example may further include an expansion outlet 612 coupled to the power inlet port 602, and a primary bus port 614 and a secondary bus port 616, coupled to the controller 608, for operation in the expansion configuration as disclosed in reference to FIG. 3A and FIG. 3B.

Various features of the examples disclosed herein may be combined in other manifestations of example multi-socket power extension sources. For example, any of the controllers 108, 308a, 308b, 308c, 508, and 608 may include a current limit input circuit to set a prescribed current limit, similar to the controller 508. Any of the controllers 108, 308a, 308b, 308c, 508, and 608 may include a PLC module coupled to a power source, to set a prescribed current limit, similar to the controller 608.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments.

Rather, the scope of the disclosure should be defined in accordance with the following claims and their equivalents.

What is claimed is:

1. A multi socket power extension source, comprising:
a power inlet port;
a plurality of power outlets coupled to the power inlet port;
a plurality of switches, wherein each of the plurality of power outlets is coupled to the power inlet port through a corresponding switch of the plurality of switches; and
a controller coupled to the plurality of switches configured to:
estimate a total current through the power inlet port;
in response to estimating that the total current through the power inlet port exceeds a prescribed current limit:
identify a first power outlet of the plurality of power outlets with a largest increase in current; and
cause a first switch coupled to the first power outlet to turn off the first power outlet; and
in response to satisfaction of a predetermined condition, cause the first switch coupled to the first power outlet to turn on the first power outlet.

2. The multi socket power extension source of claim 1, wherein the controller is configured to determine the largest increase in current by subtracting a previous measured current through each outlet from a present measure of current through each outlet to generate a delta current for each outlet and comparing the delta current for each outlet to each other.

3. The multi socket power extension source of claim 2, wherein the previous measured current through each outlet is a most recent measurement of current through each outlet, stored by the controller, prior to the total current exceeding the prescribed current limit.

4. The multi socket power extension source of claim 1, further comprising:
a separate current sensor coupled to each power outlet,
wherein each current sensor is configured to provide a signal to the controller, the signal corresponding to current through a respective power outlet; and
wherein the controller is configured to:
receive the signal from each current sensor,
store each signal in association with the respective power outlet,
estimate the total current through the power inlet port by adding the signals, and
compare the estimated total current through the power inlet port to the prescribed current limit.

5. The multi socket power extension source of claim 4, wherein the controller is configured to digitally filter signals to the controller corresponding to current through the plurality of power outlets using a low-pass filter procedure, and a separate low pass filter is coupled between each current sensor and the controller.

6. The multi socket power extension source of claim 1, further including a single current sensor, the single current sensor being coupled to the plurality of power outlets through a multiplexer controlled by the controller, the single current sensor being configured to provide a signal to the controller corresponding to current through the single current sensor, wherein the controller is configured to cause the multiplexer to couple the single current sensor to each power outlet in turn.

7. The multi socket power extension source of claim 1, wherein the predetermined condition is that the total current through the power inlet port is less than the prescribed current limit by at least a most recent measurement of current through the first power outlet.

8. The multi socket power extension source of claim 1, wherein the predetermined condition is that a prescribed reconnect time period has elapsed.

9. The multi socket power extension source of claim 1, wherein the controller is configured to cause the first switch coupled to the first power outlet to turn off the first power outlet in response to a device connected to the first power outlet being fully charged.

10. The multi socket power extension source of claim 1, wherein the controller is coupled to a secondary controller of a secondary multi socket power extension source having secondary power outlets, wherein the controller is configured to function as a primary controller and the secondary power outlets are included in the plurality of power outlets coupled to the power inlet port.

11. The multi socket power extension source of claim 10, wherein the controller is configured to receive, from the secondary controller, signals of currents through the secondary power outlets.

12. The multi socket power extension source of claim 11, wherein the controller is configured to transmit a request to the secondary controller to indicate currents through the secondary power outlets.

13. The multi socket power extension source of claim 10, wherein the controller is configured to transmit an instruction to the secondary controller to turn off a secondary switch coupled to one of the secondary power outlets.

14. The multi socket power extension source of claim 1, wherein the controller is coupled to an upstream multi socket power extension source and the controller is configured to function as a secondary controller to a primary controller of the upstream multi socket power extension source and to transmit measurements of currents through the plurality of power outlets to the primary controller.

15. A method of operating a multi socket power extension source, comprising:
continuously estimating a total current through a power inlet port;
comparing the estimated total current through the power inlet port of the multi socket power extension source to a prescribed current limit;
in response to detecting that the estimated total current through the power inlet port exceed a prescribed limit:
identify a first power outlet of a plurality of power outlets having a largest increase in current of the plurality of power outlets, wherein each of the plurality of power outlets are coupled to the power inlet port via a corresponding plurality of switches; and
causing a controller to turn off a first switch coupled to the first power outlet; and
in response to satisfaction of a predetermined condition, causing the controller to turn on the first switch.

16. The method of claim 15, wherein identifying the first power outlet having the largest increase in current includes subtracting a previous measured current through each outlet from a present measure of current through each outlet to generate a delta current for each outlet and comparing the delta current for each outlet to each other.

17. The method of claim 15, wherein the predetermined condition is that the estimated total current through the power inlet port is less than the prescribed current limit by at least a most recent measurement of current through the first power outlet.

18. The method of claim 15, wherein the predetermined condition is that a prescribed reconnect time period has elapsed.

19. The method of claim 15, wherein the controller is configured to cause the first switch coupled to the first power outlet to turn off the first power outlet in response to a device connected to the first power outlet being fully charged.

20. The method of claim 15, wherein the controller is coupled to a secondary controller of a second multi socket power extension source having secondary power outlets, wherein the controller, in response to being coupled to the secondary controller, is configured to function as a primary controller and to identify the first power outlet having the largest increase in current of the plurality of power outlets of the multi socket power extension source and the secondary power outlets.

21. A system comprising:
a power inlet port;
a plurality of multi socket power extension sources coupled together, the plurality of multi socket power extension sources each having:
a plurality of power outlets,
a plurality of switches, wherein each of the plurality of power outlets is coupled to the power inlet port through a corresponding switch of the plurality of switches, and
a controller coupled to the plurality of switches;
a primary controller, corresponding to a first multi socket power extension source of the plurality of multi socket power extension sources, the primary controller receives measurements from one or more secondary controllers of downstream multi socket power extension sources; and
the primary controller configured to:
estimate a total current through the power inlet port,
identify a first power outlet having a largest increase in current of the plurality of power outlets of the first multi socket power extension source and of secondary power outlets associated with the downstream multi socket power extension sources,
cause a first switch coupled to the first power outlet to turn off the first power outlet, and
in response to satisfaction of a predetermined condition, cause the first switch coupled to the first power outlet to turn on the first power outlet.

22. The system of claim 21, further including a primary bus port coupled to the primary controller and a secondary bus port coupled to the primary controller, wherein the primary controller is configured to function as the primary controller in response to being coupled to a secondary controller through the primary bus port and the secondary bus port is free of an external connection.

23. The system of claim 21, further including user-set input components for designating primary controller status.

24. The system of claim 21, further including an expansion power outlet coupled to the power inlet port.

25. The system of claim 21, wherein a secondary controller is configured to function as the secondary controller in response to being coupled to the primary controller of a primary multi socket power extension source having primary power outlets and coupled to a tertiary controller of a tertiary multi socket power extension source having tertiary power outlets, wherein the controller is configured to receive signals of currents through the tertiary power outlets from the tertiary controller and transmit the signals of currents through the tertiary power outlets to the primary controller.

\* \* \* \* \*